Patented Aug. 1, 1939

2,167,874

UNITED STATES PATENT OFFICE 2,167,874

CEMENT AND METHOD OF MAKING THE SAME

David E. Cordier, Toledo, Ohio, and Emil H. Balz, Pittsburgh, Pa., assignors to Plaskon Company, Incorporated, a corporation of Delaware No Drawing. Application February 3, 1936, Serial No. 62,044

6 Claims. (Cl. 134—26)

This invention relates particularly to cements for binding together articles made of thermosetting resins such as formaldehyde-urea resins and formaldehyde-phenol resins, and one of its objects is the production of a cement which has superior binding qualities when applied to surfaces of thermoset moldings.

Another object is the production of a cement which hardens without the loss of volatiles and hence can be used in closed spaces.

Another object is the provision of a cement which hardens by thermosetting action, the speed of which is subject to control and can be varied within wide limits.

The above-mentioned objects are accomplished by the process of this invention, which will be first described in general terms and then illustrated by specific example.

In making the cement of my invention, 1 mol of phenol is reacted with about 3 mols of formaldehyde in the presence of a sufficient quantity of alkali carbonate, such as sodium carbonate, to prevent precipitation while the solution is heated for from 15 to 18 hours at 40 to 50 degrees centigrade, about ½ mol of alkali carbonate dissolved in 4 times its weight in water being effective to retain the reaction products in solution. After the first stage has proceeded under such conditions for from 15 to 18 hours, the solution is neutralized with acid, whereupon the formaldehyde-phenol reaction product is precipitated. The precipitate is then washed with water to remove the salt formed in neutralizing the solution, plasticizers are added, the water is removed by vacuum evaporation, and the residue is acidified to enhance its hardening properties.

The cement thus produced is a very tacky material, the viscosity of which may vary from that of thin honey to that of thick tar, the viscosity being dependent upon the time and temperature of the reaction, the amount of plasticizer added and the extent to which water has been evaporated. The color of the cement may vary from light yellow to dark red, the color being affected by exposure of the material to air during processing, by the purity of the water used in washing the resins and by the acid content.

The acidified cement is applied as a thin coating to the surfaces which are to be bound together. It adheres tenaciously, even to polished surfaces of thermoset resin moldings. After application of the cement, the parts may be pressed together and the cement hardened at various temperatures and times of heating ranging from 150° C. for several seconds to room temperature for several days. The cement hardens without drying or oxidation, the action being wholly internal.

The invention is illustrated by, but not restricted to, the following example:

To 100 parts by weight of phenol are added 258 parts (3 mols) of a 37% solution of formaldehyde and a solution of 56 parts by weight (.5 mol) of sodium carbonate in 258 parts of water. The mixture is heated at 45° C. and held at that temperature for 16 hours.

The solution so prepared is neutralized (pH 7.0) with the required amount of 33% sulfuric acid solution. The material so precipitated is separated and vigorously stirred with 200 parts by weight of water. The precipitate is again separated and twice more washed in the same manner.

The precipitate then is treated with 18 parts by weight of ethylene glycol, and the water is evaporated from the mixture under reduced pressure until boiling has practically stopped with a vacuum of more than 29 inches of mercury and the temperature of the material at 50° C.

About 120 parts by weight of material is obtained in this way. The material at this stage will remain practically unchanged for several months, if kept in a cool place.

To prepare the material for use, 15 parts by weight of material prepared in the above specific manner is intimately admixed with one part of a 60% solution of 85% syrupy orthophosphoric acid in ethylene glycol. The cement will harden in 4–8 seconds at 145° C., but will keep 8–12 hours at room temperature without excessive stiffening.

Good results are obtained by covering the surfaces to be cemented together with a thin layer of the cement, clamping them together, and hardening the cement by baking at 80° C. for 2 hours.

The proportions, temperatures and periods of time employed may be varied within rather wide limits. The molecular ratio of formaldehyde to phenol, for example, may be reduced to 2.2 or increased to 3.6 and a good product obtained without undue waste of formaldehyde.

The temperatures at which the formaldehyde and phenol can be reacted successfully range from room temperature to 60° C., but the temperatures and times of reaction are somewhat interdependent, the lower the temperature the greater the time required for the first reaction. When the reaction takes place at very low temperatures the alkalinity of the solution may be somewhat less. The amount of alkali employed at any temperature of reaction must, however, be great enough to prevent premature condensation and consequent separation of the formaldehyde-phenol reaction product from the solvent. A greater excess of alkali carbonate may be employed without spoiling the product, but the employment and neutralization of a great excess is wasteful. Various basic and acidic compounds can be employed for adjusting the pH, but those forming salts which can be removed by washing are preferable.

Likewise other plasticizers or softening agents than ethylene glycol may be admixed with the precipitate. Those having a solvent action with the precipitate, but which are not highly volatile, are preferable. Orthophosphoric acid is given preference in the above specific example as a hardening agent for the reason that a sufficient quantity for proper hardening may be added in a small amount of ethylene glycol and thus dispersed throughout the mass, the small amount of additional ethylene glycol required as a vehicle for the acid being insufficient to unduly thin out the cement. Other acidic substances may, however, be substituted for orthophosphoric acid.

The process and product herein described are to be regarded as illustrative only, and it is to be understood that the invention is susceptible to variation, modification and change within the spirit and scope of the subjoined claims.

Having described our invention, we claim:

1. A process for making a cement which includes the steps of reacting 1 mol phenol with approximately 3 mols formaldehyde in the presence of about ½ mol alkali carbonate at a temperature between 30° C. and 60° C., neutralizing the solution to precipitate formaldehyde-phenol reaction product and to form a water-soluble salt, washing the precipitate to remove the salt formed by neutralization, mixing the precipitate with ethylene glycol, evaporating water from the mixture until boiling practically stops with a vacuum of 29 inches of mercury and the temperature of the material at 50° C., and acidifying the material by the addition of one part of a 60% solution of 85% syrupy orthophosphoric acid in ethylene glycol.

2. A process for making a cement which includes the steps of reacting 1 mol phenol with approximately 3 mols formaldehyde in the presence of alkali carbonate at a temperature between 30° C. and 60° C., neutralizing the solution to precipitate formaldehyde-phenol reaction product and to form a water-soluble salt, washing the precipitate to remove the salt formed by neutralization, mixing the precipitate with ethylene glycol, evaporating substantially all of the water from the mixture, and acidifying the material by the addition of substantially one part of a solution of syrupy acid.

3. A process which includes the steps of reacting 1 mol phenol with approximately 3 mols formaldehyde in the presence of alkali carbonate at a temperature between 30° C. and 60° C., neutralizing the solution to precipitate formaldehyde-phenol reaction product and to form a water-soluble salt, washing the precipitate to remove the salt formed by neutralization, mixing the precipitate with ethylene glycol, evaporating substantially all of the water from the mixture, and acidifying the material by the addition of substantially one part of a solution of syrupy orthophosphoric acid.

4. A process which includes the steps of reacting 1 mol phenol with 2.2 to 3.6 mols formaldehyde in the presence of alkali carbonate at a temperature between 30° C. and 60° C., neutralizing the solution to precipitate formaldehyde-phenol reaction product and to form a water-soluble salt, washing the precipitate to remove the salt formed by neutralization, mixing the precipitate with ethylene glycol, evaporating substantially all of the water from the mixture, and acidifying the material by the addition of substantially one part of a 60% solution of 85% syrupy orthophosphoric acid.

5. A process for making cement which includes the steps of reacting 1 mol phenol with 2.2 to 3.6 mols formaldehyde in the presence of a basic compound effective to retain the reaction products in solution at a temperature of about 45° C., neutralizing the solution to precipitate formaldehyde-phenol reaction product and to form a salt soluble in water, washing the precipitate to remove the salt formed by neutralization, treating the precipitate with a softener having a solvent action on the precipitate and having low volatility, evaporating substantially all the water from the mixture, and acidifying the material to a degree at which it will harden when heated to a temperature of 80° C. for about 2 hours.

6. A process for making cement which includes the steps of reacting 1 mol phenol with 2.2 to 3.6 mols formaldehyde in the presence of a basic compound effective to retain the reaction products in solution at a temperature of about 45° C., neutralizing the solution to precipitate formaldehyde-phenol reaction product and to form a salt soluble in water, washing the precipitate to remove the salt formed by neutralization, treating the precipitate with a softener having a solvent action on the precipitate and having low volatility, evaporating substantially all the water from the mixture, and acidifying the material.

DAVID E. CORDIER.
EMIL H. BALZ.